United States Patent
Wu et al.

(10) Patent No.: US 11,777,365 B1
(45) Date of Patent: Oct. 3, 2023

(54) MOTOR WITH FLEXIBLE VARIABLE FLOW CHANNEL

(71) Applicant: NANCHANG SANRUI INTELLIGENT TECHNOLOGY CO., LTD, Nanchang (CN)

(72) Inventors: Qicai Wu, Nanchang (CN); Min Wu, Nanchang (CN); Xiaoguang Wu, Nanchang (CN); Yi Li, Nanchang (CN)

(73) Assignee: NANCHANG SANRUI INTELLIGENT TECHNOLOGY CO., LTD, Nanchang (CN)

( * ) Notice: Subject to any disclaimer, the term of this patent is extended or adjusted under 35 U.S.C. 154(b) by 0 days.

(21) Appl. No.: 18/080,045

(22) Filed: Dec. 13, 2022

(30) Foreign Application Priority Data

May 23, 2022 (CN) .......................... 202210559512.6

(51) Int. Cl.
*H02K 5/20* (2006.01)
*H02K 9/19* (2006.01)

(52) U.S. Cl.
CPC ............... *H02K 5/203* (2021.01); *H02K 9/19* (2013.01)

(58) Field of Classification Search
CPC .......... H02K 5/203; H02K 9/19; H02K 9/193; H02K 9/197
See application file for complete search history.

(56) References Cited

U.S. PATENT DOCUMENTS

| 10,752,082 B1 | 8/2020 | Kearney et al. |
| 2003/0071233 A1 | 4/2003 | Stewart et al. |
| 2021/0083547 A1* | 3/2021 | Vanhee ................ H02K 5/18 |

FOREIGN PATENT DOCUMENTS

| CN | 204922126 U | 12/2015 |
| CN | 106455413 A | 2/2017 |
| CN | 106849508 A | 6/2017 |
| CN | 108475968 A | 8/2018 |
| CN | 109514146 A | 3/2019 |
| CN | 109723534 A | 5/2019 |
| CN | 109844463 A | 6/2019 |
| CN | 209681115 U | 11/2019 |

(Continued)

OTHER PUBLICATIONS

Knappenberger (EP 2701286 A2) English Translation (Year: 2014).*

*Primary Examiner* — Tulsidas C Patel
*Assistant Examiner* — Robert E Mates
(74) *Attorney, Agent, or Firm* — Daniel M. Cohn; Howard M. Cohn

(57) ABSTRACT

A motor includes a flexible variable flow channel arranged in the motor along a heat source distribution direction. The flexible variable flow channel includes a flow channel main body, at least one flexible component module mounted in the flow channel main body, a support body, and a quick adapter. The flow channel main body is configured to store and transfer a heat transferring liquid. The heat transferring liquid is configured to dissipate heat from the heat sources. The at least one flexible component module is configured to change a flow and a flow state of the heat transferring liquid flowing through the at least one flexible component module. The support body is configured to support the at least one flexible component module. The quick adapter is configured to quickly mount the at least one flexible component module. The at least one flexible component module is selected from four structures.

9 Claims, 4 Drawing Sheets

(56) References Cited

FOREIGN PATENT DOCUMENTS

| | | | | |
|---|---|---|---|---|
| CN | 211623733 U | 10/2020 | | |
| EP | 2701286 A2 * | 2/2014 | ............... | H02K 5/20 |
| EP | 3267080 A1 | 1/2018 | | |
| WO | 9944740 A1 | 9/1999 | | |

* cited by examiner

MOTOR WITH FLEXIBLE VARIABLE FLOW CHANNEL

TECHNICAL FIELD

The present disclosure relates to a technical field of motor and driver technology, and in particular to a motor dissipating heat by a flexible variable flow channel.

BACKGROUND

Aero motors and drives are getting more and more powerful while being smaller and smaller. In order to dissipate heat generated in a small space, air-cooled heat dissipation structures can no longer meet requirements. Liquid-cooled technology is introduced to be a necessary means to dissipate heat from the aero motors and the drives. However, except for integrating a liquid-cooled dissipating system into the aero motors and the drivers, it is also necessary to solve a problem of how to make the liquid-cooled dissipating system work efficiently and at the same time make the liquid-cooled dissipating system energy efficient.

A conventional liquid-cooled dissipating system is limited to adjusting a speed of a pump to control a flow of a heat transferring liquid when the heat transferring liquid is circulating. When there are multiple heat sources in a whole circulation loop, heat dissipation requirements of each of the heat sources are different since heat powers of the heat sources varies and heat distribution of the heat sources varies. The conventional liquid-cooled dissipating system only changes the flow by the pump, and a heat dissipation effect of each of the heat sources is same, so each of the heat sources is unable to obtain the flow of heat transferring liquid required by each of the heat sources.

In addition, during a process of flowing in the conventional liquid-cooled dissipating system, the heat transferring liquid generates abnormal flow states due to flow resistance, a system structure, and other factors, which reduce the heat dissipation effect.

Therefore, there is a need to develop a flexible variable flow channel that is able to automatically adjust the flow and a flow state of the heat transferring liquid within the liquid-cooled dissipating system. The flexible variable flow channel automatically adjusts the flow and a flow state distribution of the heat transferring liquid flowing through the heat sources. A local structure of the flexible variable flow channel is adjusted according to the flow and flow state distribution of the heat transferring liquid in the whole liquid-cooled dissipating system, and then a shape of the flexible variable flow channel is structured.

SUMMARY

In view of problems mentioned in the prior art, a purpose of the present disclosure is to provide a motor dissipating heat by a flexible variable flow channel. The motor dissipates heat through the flexible variable flow channel arranged inside. The flexible variable flow channel dissipates heat from heat sources at the same time and automatically adjusts a flow and a flow state distribution of a heat transferring liquid flowing through the heat sources, making heat dissipation efficient and energy efficient.

To achieve the above purpose, the present disclosure provides the motor dissipating heat by the flexible variable flow channel. The motor comprises the flexible variable flow channel arranged in the motor along a heat source distribution direction. The flexible variable flow channel contacts heat sources. The flexible variable flow channel comprises a flow channel main body, at least one flexible component module mounted in the flow channel main body, a support body, and a quick adapter. The flow channel main body is configured to store and transfer a heat transferring liquid. The heat transferring liquid is configured to dissipate heat from the heat sources. The at least one flexible component module is configured to change a flow and a flow state of the heat transferring liquid flowing through the at least one flexible component module. The support body is configured to support the at least one flexible component module. The quick adapter is configured to quickly mount the at least one flexible component module. The at least one flexible component module is selected from four structures. The four structures are an inlet and outlet module, a straight flow channel module, a corner bending module, and a movable rectification module. The inlet and outlet module is configured to be arranged in an inlet/outlet of the flow channel main body. The straight flow channel module is configured to be arranged in a straight channel of the flow channel main body. The corner bending module is configured to be arranged on a corner or a bent portion of the flow channel main body. The movable rectification module is configured to be arranged in the flow channel main body when there are the heat sources arranged side by side.

Each flexible component module is selected from one of the four structures according to positions of the heat sources in the motor. When a plurality of flexible component modules are provided, the plurality of flexible component modules cooperate with each other and is arranged in the flow channel main body. The at least one flexible component module comprises a deformation displacement adjusting mechanism. The deformation displacement adjusting mechanism is configured to change a shape or a position of the at least one flexible component module.

Furthermore, the at least one flexible component module comprises a housing made of a flexible material. The housing of the at least one flexible component module has a smooth shape or is arranged on a fixed position in a non-working state. When in a working state, the deformation displacement adjusting mechanism drives the housing of the at least one flexible component module to quickly deform or displace. In the working state, the housing of the at least one flexible component module is capable of bearing a certain load, deforms in different directions to generate the smooth shape, and changes a shape of the flow channel main body.

Furthermore, at least one splitter plate is arranged in the inlet of the flow channel main body. The at least one splitter plate adjusts a respective flow of the heat transferring liquid in different cooling flow channel branches.

Furthermore, the movable rectification module is deformable and the movable rectification module is capable of moving as a whole to change a position of the movable rectification module. A housing of the movable rectification module deforms in different directions under acting forces to generate a smooth shape. The deformation displacement adjusting mechanism is configured to adjust a three-dimensional position of the housing of the movable rectification module connected with the deformation displacement adjusting mechanism, so a shape of the movable rectification module is adjusted. The deformation displacement adjusting mechanism is configured to adjust a position of the movable rectification module relative to the flow channel main body, so the flow and the flow state of the heat transferring liquid flowing through the movable rectification module are adjusted.

Furthermore, the straight flow channel module is capable of radially contracting and deforming. A housing of the straight flow channel module is made of a flexible material. The housing of the straight flow channel module is radially deformed under acting force to generate a smooth shape, so the shape of the flow channel main body is adjusted and the flow of the heat transferring liquid flowing through the straight flow channel module is changed.

Furthermore, the corner bending module is bent and deformed according to an actual flow and flow requirements of the heat transferring liquid. A housing of the corner bending module is made of the flexible material. The housing of the corner bending module is bent and deformed around a central axis of a bending pipe under the acting force, so that the shape of the flow channel main body is adjusted and the flow and the flow state of the heat transferring liquid flowing through the corner bending module are changed.

Furthermore, the inlet and outlet module automatically changes a diameter of the inlet/outlet of the flow channel main body according to an actual flow and flow requirements of the heat transferring liquid, so the shape of the flow channel main body is adjusted and a flow and a flow state of the heat transferring liquid flowing through the inlet and outlet module are changed.

Furthermore, the at least one flexible component module is arranged in the flow channel main body. When one flexible component module is provided, the flexible component module works independently. When a plurality of flexible component modules are provided a pair of the flexible component modules is symmetrically arranged in a radial direction of the flow channel main body.

Furthermore, the support body and the quick adapter are arranged inside the flow channel main body or the support body and the quick adapter are arranged outside the flow channel main body.

A principle of the present disclosure is as follow:

In the flexible variable flow channel of the present disclosure, because the flexible variable flow channel contacts the heat sources to be dissipated, heat generated by the heat sources to be dissipated during a wording process is transferred to the heat transferring liquid stored in the flexible variable flow channel, while the heat transferring liquid flows in the flexible variable flow channel to transfer the heat generated by the heat sources. Thus, the heat generated by the heat sources is dissipated. At the same time, aiming to a problem that heat dissipation requirements of the heat sources in a liquid-cooled dissipating system change under different working conditions, the flexible variable flow channel automatically adjusts the flow and a flow state distribution of the heat transferring liquid flowing through the liquid-cooled dissipating system. The flexible variable flow channel is structured according to a flow of the liquid-cooled dissipating system, so a shape of the optimal flexible variable flow channel is structured to be matched with the heat sources, which eliminates abnormal and ineffective flow of the heat transferring liquid, enhances heat dissipation efficiency, and strengthens a heat dissipation effect. Further, the flexible variable flow channel also avoids noise caused by a flow control of conventional flow channels. Furthermore, by changing the flow state of the heat transferring liquid, a pipeline of the flexible variable flow channel is cleaned to prevent the pipeline from clogging. A working principle of the plurality of flexible component modules is that each of the plurality of flexible component modules have the smooth shape or is arranged on the fixed position in the non-working state. When in the working state, the housing of each of the plurality of flexible component modules quickly deforms or displaces and bearing a certain load. The housing of each of the plurality of flexible component modules deforms in different directions to generate the smooth shape, and changes the shape of the flow channel main body.

The at least one flexible component module can adjust the appropriate shape of the flow channel body according to the demand of the heat source and the flow of the pump. The flexible variable flow channel automatically adjusts the flow and flow state distribution of the heat transferring liquid flowing through the liquid-cooled dissipating system, thereby eliminating abnormal and ineffective flow of the heat transferring liquid, improving heat dissipation efficiency, and strengthening the heat dissipation effect. The present disclosure avoids the noise caused by the flow control of the conventional flow channels. By changing the flow state of the heat transferring liquid, the pipeline of the flexible variable flow channel is cleaned to prevent the pipeline from clogging. By arranging the plurality of flexible component modules with different structures for different types of heat sources, a compatible solution is designed quickly.

Figure 1:
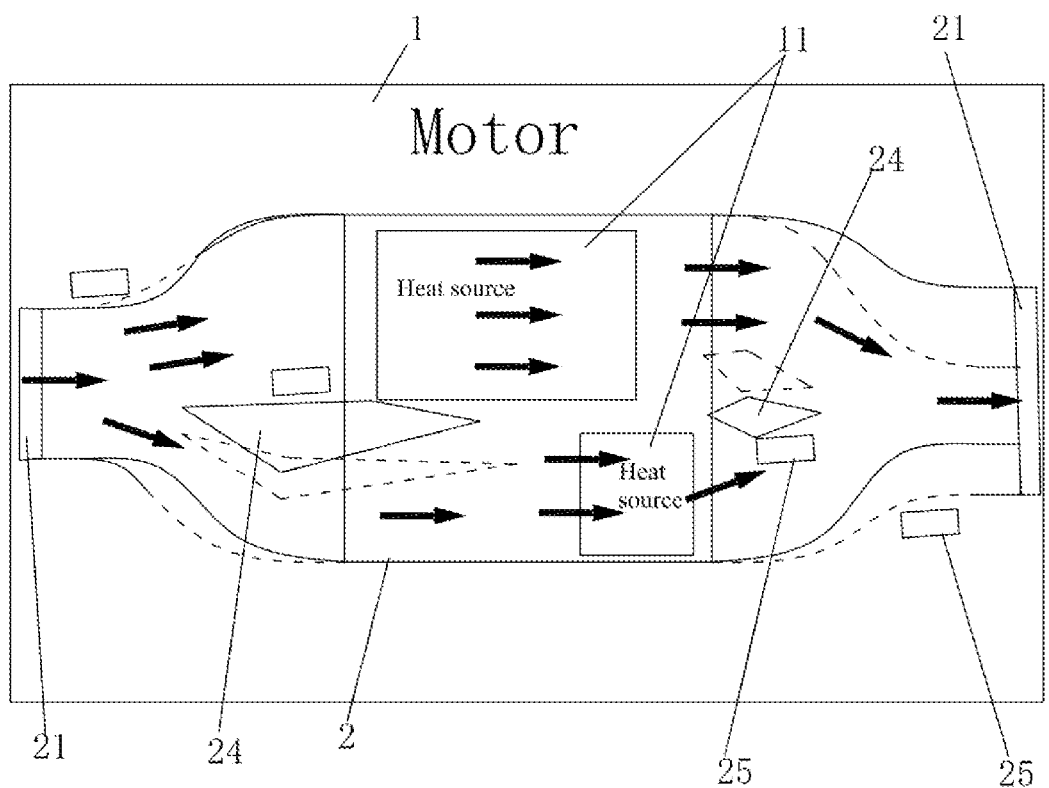
FIG. 1 is a schematic diagram of a motor dissipating heat by a flexible variable flow channel according to a first embodiment of the present disclosure.

1—motor, 11—heat source, 2—flow channel main body, 21—inlet and outlet module, 22—straight flow channel module, 23—corner bending module, 24—movable rectification module, 25—deformation displacement adjusting mechanism, 26—splitter plate.

DETAILED DESCRIPTION

Technical solutions of the present disclosure are further described in detail below by embodiments and accompanying drawings of the specification.

As shown in FIGS. 1-4, the present disclosure provides the motor 1 dissipating heat by the flexible variable flow channel. The motor comprises the flexible variable flow channel arranged in the motor along a heat source distribution direction. The flexible variable flow channel contacts heat sources. The flexible variable flow channel comprises a flow channel main body 2, at least one flexible component module mounted in the flow channel main body, a support body, and a quick adapter. The flow channel main body is configured to store and transfer a heat transferring liquid. The heat transferring liquid is configured to dissipate heat from the heat sources. The at least one flexible component module is configured to change a flow and a flow state of the heat transferring liquid flowing through the at least one flexible component module. The support body is configured to support the at least one flexible component module. The quick adapter is configured to quickly mount the at least one flexible component module. The at least one flexible component module is selected from four structures. The four structures are an inlet and outlet module 21, a straight flow channel module 22, a corner bending module 23, and a movable rectification module 24. The inlet and outlet module 21 is configured to be arranged in an inlet/outlet of the flow channel main body. The straight flow channel module is configured to be arranged in a straight channel of the flow channel main body, the corner bending module is configured to be arranged on a corner or a bent portion of the flow channel main body. The movable rectification module is configured to be arranged in the flow channel main body when there are the heat sources arranged side by side.

Each flexible component module is selected from one of the four structures according to positions of the heat sources in the motor. When a plurality of flexible component modules are provided, the plurality of flexible component modules cooperate with each other and are arranged in the flow channel main body. Combinations of the plurality of flexible component modules with different structures are set forth in following embodiments. The at least one flexible component module comprises a deformation displacement adjusting mechanism. The deformation displacement adjusting mechanism 25 is configured to change a shape or a position of the at least one flexible component module.

The at least one flexible component module comprises a housing made of a flexible material. The housing of the at least one flexible component module has a smooth shape or is arranged on a fixed position in a non-working state. When in a working state, the deformation displacement adjusting mechanism 25 drives the housing of the at least one flexible component module to quickly deform or displace. In the working state, the housing of the at least one flexible component module is capable of bearing a certain load, deforms in different directions to generate the smooth shape, and changes a shape of the flow channel main body.

In some embodiments, the movable rectification module 24 is an adjusting structure mounted in the flow channel main body. The adjusting structure is movable and deformable in a certain range in a certain area of the flow channel main body (other modules may be arranged in the certain area, or the certain area is a fixed flow channel area). The movable rectification module 24 comprise a metal framework arranged inside the movable rectification module 24 and a flexible cover wrapping around the metal framework. The flexible cover is made of flexible polymer or rubber material. The movable rectification module 24 is movable and deformable as required in an area where the flow of the heat transferring liquid needs to be adjusted. An overall shape of the movable rectification module 24 may be a block structure or a structure with a convex flexible side wall.

Furthermore, the movable rectification module 24 is deformable and the movable rectification module is capable of moving as a whole to change a position of the movable rectification module. A housing of the movable rectification module deforms in different directions under acting forces to generate a smooth shape. The deformation displacement adjusting mechanism is configured to adjust a three-dimensional position of the housing of the movable rectification module connected with the deformation displacement adjusting mechanism, so a shape of the movable rectification module is adjusted. The deformation displacement adjusting mechanism is configured to adjust a position of the movable rectification module 24 relative to the flow channel main body 2, so the flow and the flow state of the heat transferring liquid flowing through outer surfaces of the movable rectification module 24 are adjusted.

In some embodiments, the straight flow channel module 22 is a straight flexible pipe, two ends of the straight flexible pipe may be fixed with other joints of other modules. The flow and the flow state of the heat transferring liquid flowing through the straight flexible pipe are adjusted by changing a shape of the straight flexible pipe thus changing a volume of the flow channel main body. The straight flexible pipe is made of flexible metal, flexible polymer, or rubber material.

The straight flow channel module 22 is capable of radially contracting and deforming. A housing of the straight flow channel module is made of the flexible material. The housing of the straight flow channel module 22 is radially deformed under the acting force to generate a smooth shape, so the shape of the flow channel main body 2 is adjusted and a flow of the heat transferring liquid flowing through outer surfaces of the straight flow channel module 22 is changed.

In some embodiments, the corner bending module 23 is a corner structure mounted on the corner of the flow channel main body or the corner bending module 23 is a bending structure mounted on the bent portion of the flow channel main body. The corner bending module 23 adjusts a shape of the corner of the flow channel main body and adjusts a radius of the bent portion of the flow channel main body. Walls of the corner bending module 23 are made of the flexible polymer or the rubber material, which has a large expansion and bending characteristics. The corner bending module 23 is to adjust the flow state of the heat transferring liquid in the corner or the bent portion of a transition channel of the flow channel main body that generated by adjustments of different modules. (The heat transferring liquid can be adjusted according to the flow and the flow state so that the heat transferring liquid flows in a laminar flow state).

The corner bending module 23 is bent and deformed according to an actual flow and flow requirements of the heat transferring liquid. A housing of the corner bending module 23 is made of the flexible material. The housing of the corner bending module is bent and deformed around a central axis of a bending pipe under the acting force, so that the shape of the flow channel main body is adjusted and the flow and the flow state of the heat transferring liquid flowing through outer surfaces of the corner bending module 23 are changed.

In some embodiments, the inlet and outlet module 21 is a pipeline joint mounted on the inlet and the outlet of the flow channel main body. The inlet and outlet module 21 is configured to control inflow and outflow of the heat transferring liquid. A first end of the inlet and outlet module 21 is a fixed joint and a second end of the inlet and outlet module 21 is a flexible joint. The first end of the inlet and outlet module 21 and the second end of the inlet and outlet module 21 are connected by a flexible pipe. A shape of the flexible pipe is adjusted by a drive element. The inlet and outlet module is mainly for the transition and regulation of the flow state during the inflow or the outflow of the heat transferring liquid. The flexible joint of the inlet and outlet module 21 may be connected with other joints of other modules. The fixed joint of the inlet and outlet module 21 and the flexible joint of the inlet and outlet module 21 are made of metal or polymer materials. The flexible pipe of the inlet and outlet module 21 is made of flexible polymer or rubber materials, which is not limited thereto.

The inlet and outlet module 21 automatically changes a diameter of the inlet/outlet of the flow channel main body 2 according to an actual flow and flow requirements of the heat transferring liquid, so the shape of the flow channel main body is adjusted and the flow and the flow state of the heat transferring liquid flowing through outer surfaces of the inlet and outlet module 21 are changed.

The above-mentioned modules are mounted on different positions of the flow channel main body to adjust the flow and the flow state of the heat transferring liquid flowing corresponding positions of the flow channel main body in the liquid-cooled dissipating system. The four structures can be used individually or in combination according to actual requirements, so that the heat transferring liquid flowing through different positions is in the laminar flow state or in a turbulent flow state. The above four structures change the flow and a flow velocity of the heat transferring liquid, so as to reduce a flow resistance of the heat transferring liquid in the flow channel main body and increase an efficiency of heat dissipation.

The at least one flexible component module is arranged in the flow channel main body. When one flexible component module is provided, the flexible component module works independently. When the plurality of flexible component modules are provided, a pair of the flexible component modules is symmetrically arranged in a radial direction of the flow channel main body.

The support body and the quick adapter are arranged inside the flow channel main body or the support body and the quick adapter are arranged outside the flow channel main body.

Embodiment 1

As shown in FIG. 1, according to distributions of the heat sources 11 arranged inside the motor 1, the flow channel main body 2 comprises, from left to right, a first inlet and outlet module 21, a first movable rectification module 24, a second movable rectification module 24, and a second inlet and outlet module 21. In an initial state, as shown in FIG. 1, the above modules are in positions shown in solid lines. After being driven and adjusted by the deformation displacement adjusting mechanisms 25, the above modules are in positions shown in dashed broken lines. Shapes of the first movable rectification module 24 and the second movable rectification module 24 are changed and overall positions of the first movable rectification module 24 and the second movable rectification module 24 are changed. It is obvious that a shape of the flow channel main body 2 after adjustment is more conducive to heat dissipation of the heat sources 11.

Embodiment 2

Figure 2:
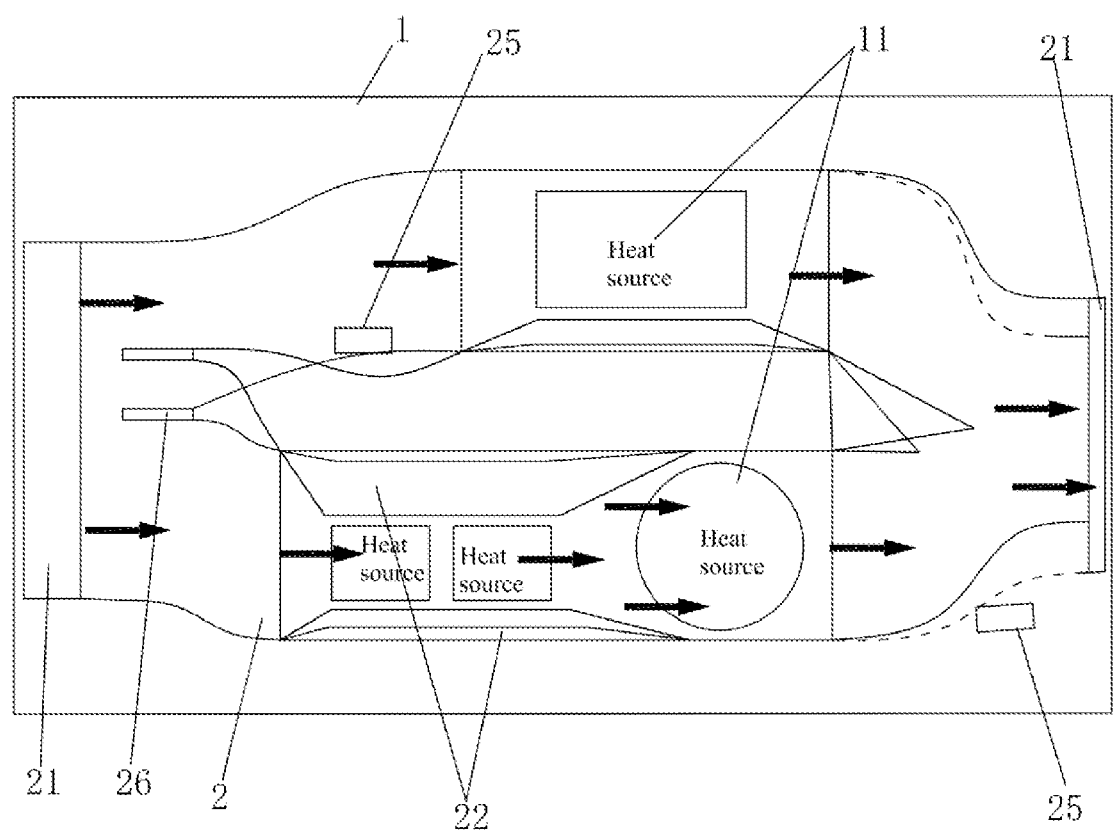
FIG. 2 is a schematic diagram of the motor dissipating heat by the flexible variable flow channel according to a second embodiment of the present disclosure.

As shown in FIG. 2, according to distributions of the heat sources 11 arranged inside the motor 1, splitter plates 26 are arranged in the inlet of the flow channel main body 2. The splitter plates 26 adjust a respective flow of branches of the heat transferring liquid in different cooling flow channel branches. When each of the branches of the heat transferring liquid flows through the cooling flow channel branches of the flow channel main body, each of the cooling flow channel branches comprises a straight flow channel compressible section. Each straight flow channel compressible section is configured to accelerate a flow velocity of a corresponding branch of the heat transferring liquid. Therefore, each of the branches of the heat transferring liquid having a same flow is compressed to have a higher flow velocity and flows through areas of the heat sources to dissipate heat. Further, the above modules may be cooperated with a liquid pump for adjustments according to a flow of the liquid pump of a whole circulation loop, so that a dissipating effect on the areas of the heat sources is always good when flows of the liquid pump and the heat transferring liquid change.

The flow channel main body 2 comprises, from left to right, a first inlet and outlet module 21, a first straight flow channel module 22, a second straight flow channel module 22, and a second inlet and outlet module 21. The first straight flow channel module 22 and the second straight flow channel module 22 are arranged side by side from top to bottom. In an initial state, as shown in FIG. 2, the above modules are in positions shown in solid lines. After being driven and adjusted by the deformation displacement adjusting mechanisms 25, the above modules are in positions shown in dashed broken lines. It is obvious that a shape of the flow channel main body 2 after adjustment is more conducive to heat dissipation of the heat sources 11.

Embodiment 3

Figure 3:
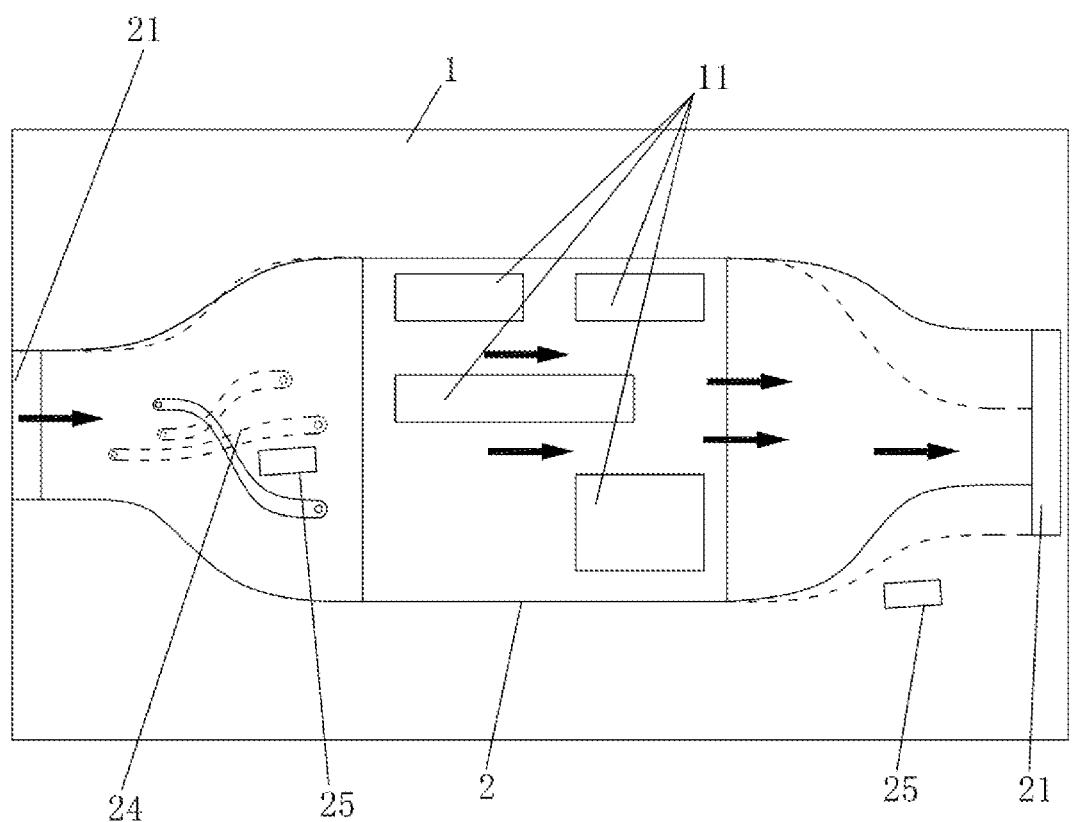
FIG. 3 is a schematic diagram of the motor dissipating heat by the flexible variable flow channel according to a third embodiment of the present disclosure.

As shown in FIG. 3, according to distributions of the heat sources 11 arranged inside the motor 1, the flow channel main body 2 comprises, from left to right, a first inlet and outlet module 21, the movable rectification module 24, and a second inlet and outlet module 21. In an initial state, as shown in FIG. 3, the above modules are in positions shown in solid lines. After being driven and adjusted by the deformation displacement adjusting mechanisms 25, the above modules are in positions shown in dashed broken lines. It is obvious that a shape of the flow channel main body 2 after adjustment is more conducive to heat dissipation of the heat sources 11.

Embodiment 4

Figure 4:
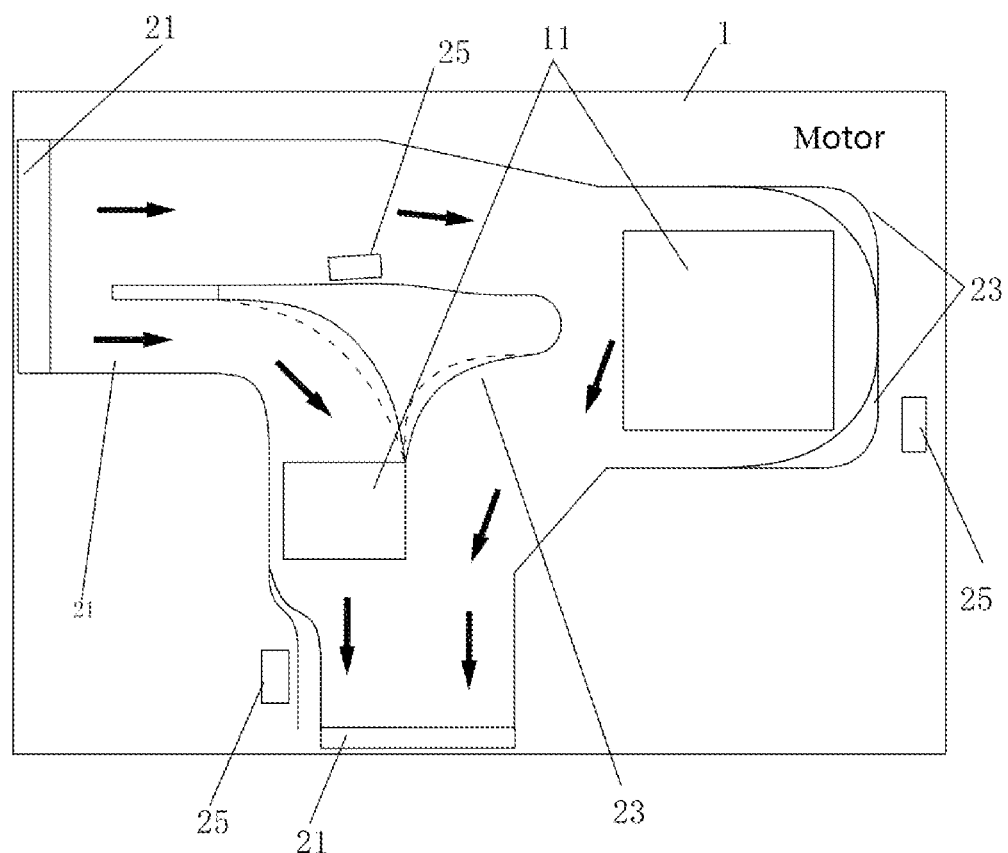
FIG. 4 is a schematic diagram of the motor dissipating heat by the flexible variable flow channel according to a fourth embodiment of the present disclosure.

As shown in FIG. 4, according to distributions of the heat sources 11 arranged inside the motor 1, the flow channel main body 2 comprises, from left to right, a first inlet and outlet module 21, a first corner bending module 23, a second corner bending module 23, and a second inlet and outlet module 21. In an initial state, as shown in FIG. 4, the above modules are in positions shown in solid lines. After being driven and adjusted by the deformation displacement adjusting mechanisms 25, the above modules are in positions shown in dashed broken lines. It is obvious that a shape of the flow channel main body 2 after adjustment is more conducive to heat dissipation of the heat sources 11.

It should be noted that for those skilled in the art, a number of improvements and embellishments can be made without departing from principles of the present disclosure, and these improvements and embellishments should fall within the protection scope of the present disclosure.

What is claimed is:

1. A motor dissipating heat by a flexible variable flow channel, comprising: the flexible variable flow channel arranged in the motor along a heat source distribution direction;

wherein the flexible variable flow channel contacts heat sources; the flexible variable flow channel comprises a flow channel main body, at least one flexible component module mounted in the flow channel main body, a support body, and a quick adapter;

wherein the flow channel main body is configured to store and transfer a heat transferring liquid; the heat transferring liquid is configured to dissipate heat from the heat sources; the at least one flexible component module is configured to change a flow and a flow state of the heat transferring liquid flowing through the at least one flexible component module; the support body is configured to support the at least one flexible component module; the quick adapter is configured to quickly mount the at least one flexible component module;

the at least one flexible component module is selected from four structures; the four structures are an inlet and outlet module, a straight flow channel module, a corner bending module, and a movable rectification module; the inlet and outlet module is configured to be arranged in an inlet/outlet of the flow channel main body; the straight flow channel module is configured to be arranged in a straight channel of the flow channel main body, the corner bending module is configured to be arranged on a corner or a bent portion of the flow channel main body; the movable rectification module is configured to be arranged in the flow channel main body when there are the heat sources arranged side by side;

wherein each flexible component module is selected from one of the four structures according to positions of the heat sources in the motor; when a plurality of flexible component modules are provided, the plurality of flexible component modules cooperate with each other and are arranged in the flow channel main body; the at least one flexible component module comprises a deformation displacement adjusting mechanism; the deformation displacement adjusting mechanism is configured to change a shape or a position of the at least one flexible component module.

2. The motor dissipating heat by the flexible variable flow channel according to claim 1, wherein the at least one flexible component module comprises a housing made of a flexible material; the housing of the at least one flexible component module has a smooth shape or is arranged on a fixed position in a non-working state; and when in a working state, the deformation displacement adjusting mechanism drives the housing of the at least one flexible component module to quickly deform or displace; in the working state; the housing of the at least one flexible component module is capable of bearing a certain load, deforms in different directions to generate a smooth shape, and changes a shape of the flow channel main body.

3. The motor dissipating heat by the flexible variable flow channel according to claim 1, wherein at least one splitter plate is arranged in the inlet of the flow channel main body; the at least one splitter plate adjusts a respective flow of the heat transferring liquid in different cooling flow channel branches.

4. The motor dissipating heat by the flexible variable flow channel according to claim 1, wherein the movable rectification module is deformable; and the movable rectification module is capable of moving as a whole to change a position of the movable rectification module; a housing of the movable rectification module deforms in different directions under acting forces to generate a smooth shape; the deformation displacement adjusting mechanism is configured to adjust a three-dimensional position of the housing of the movable rectification module connected with the deformation displacement adjusting mechanism, so a shape of the movable rectification module is adjusted; the deformation displacement adjusting mechanism is configured to adjust a position of the movable rectification module relative to the flow channel main body, so the flow and the flow state of the heat transferring liquid flowing through the movable rectification module are adjusted.

5. The motor dissipating heat by the flexible variable flow channel according to claim 1, wherein the straight flow channel module is capable of radially contracting and deforming; a housing of the straight flow channel module is made of a flexible material; the housing of the straight flow channel module is radially deformed under acting force to generate a smooth shape, so a shape of the flow channel main body is adjusted and the flow of the heat transferring liquid flowing through the straight flow channel module is changed.

6. The motor dissipating heat by the flexible variable flow channel according to claim 1, wherein the corner bending module is bent and deformed according to an actual flow and flow requirements of the heat transferring liquid; a housing of the corner bending module is made of a flexible material; the housing of the corner bending module is bent and deformed around a central axis of a bending pipe under acting force, so that a shape of the flow channel main body is adjusted and the flow and the flow state of the heat transferring liquid flowing through the corner bending module are changed.

7. The motor dissipating heat by the flexible variable flow channel according to claim 1, wherein the inlet and outlet module automatically changes a diameter of the inlet/outlet of the flow channel main body according to an actual flow and flow requirements of the heat transferring liquid, so a shape of the flow channel main body is adjusted and the flow and the flow state of the heat transferring liquid flowing through the inlet and outlet module are changed.

8. The motor dissipating heat by the flexible variable flow channel according to claim 1, wherein the at least one flexible component module is arranged in the flow channel main body; when one flexible component module is provided, the flexible component module works independently; when a plurality of flexible component modules are provided, a pair of the flexible component modules is symmetrically arranged in a radial direction of the flow channel main body.

9. The motor dissipating heat by the flexible variable flow channel according to claim 1, wherein the support body and the quick adapter are arranged inside the flow channel main body or the support body and the quick adapter are arranged outside the flow channel main body.

* * * * *